June 9, 1931. C. G. MILLER 1,809,138
AUTOMATIC CHROMIUM PLATING MACHINE
Filed June 30, 1928   7 Sheets-Sheet 1
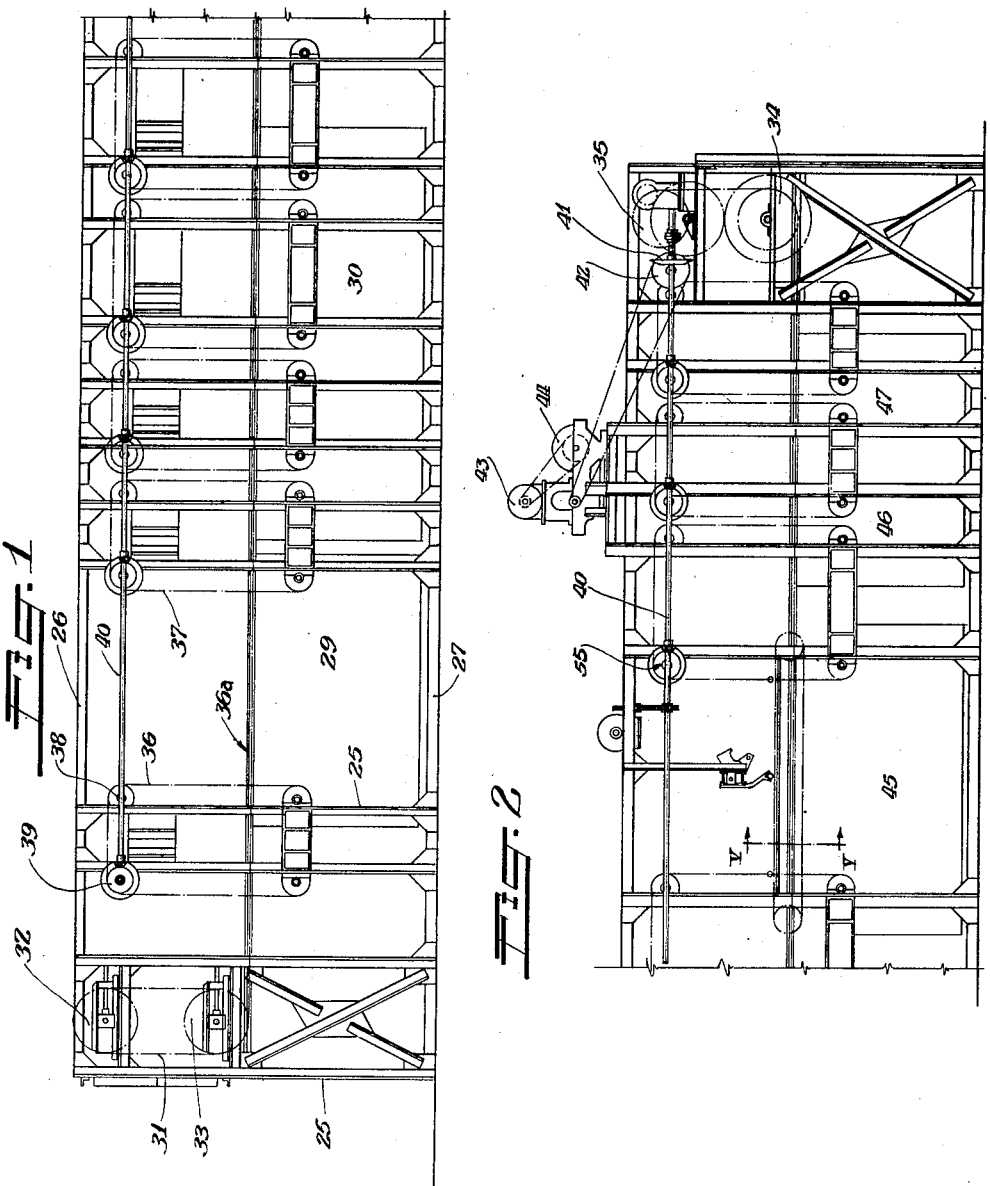
Inventor:
Constantine G. Miller.
by Charles H. Hills
Attys.

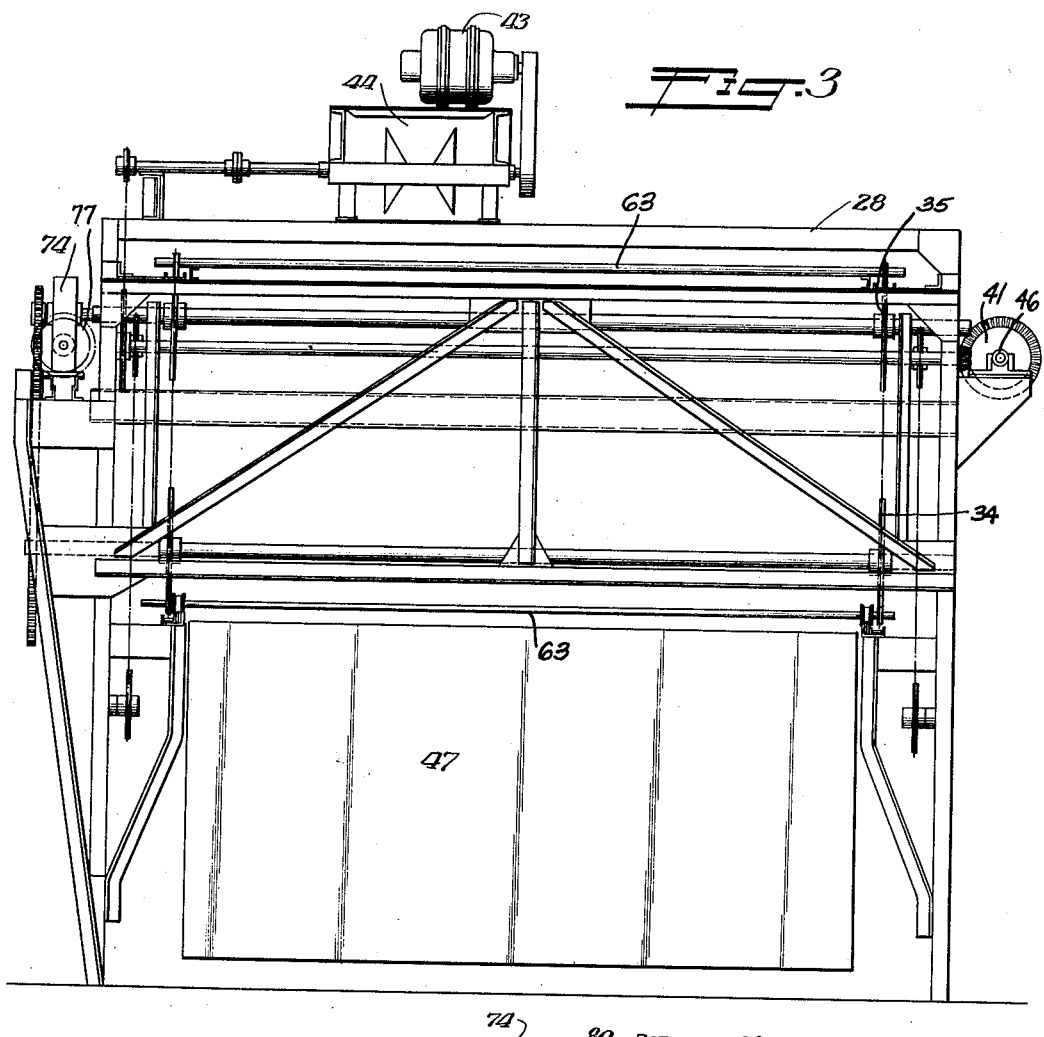

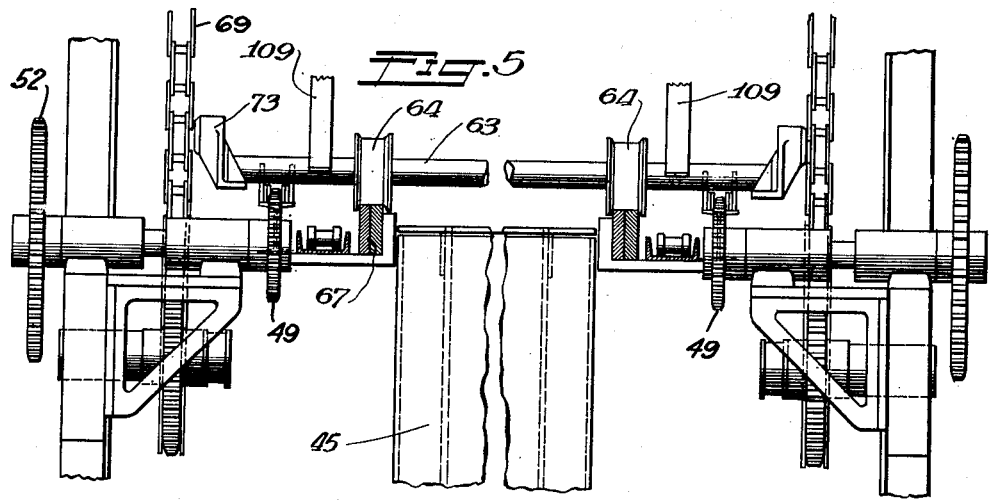
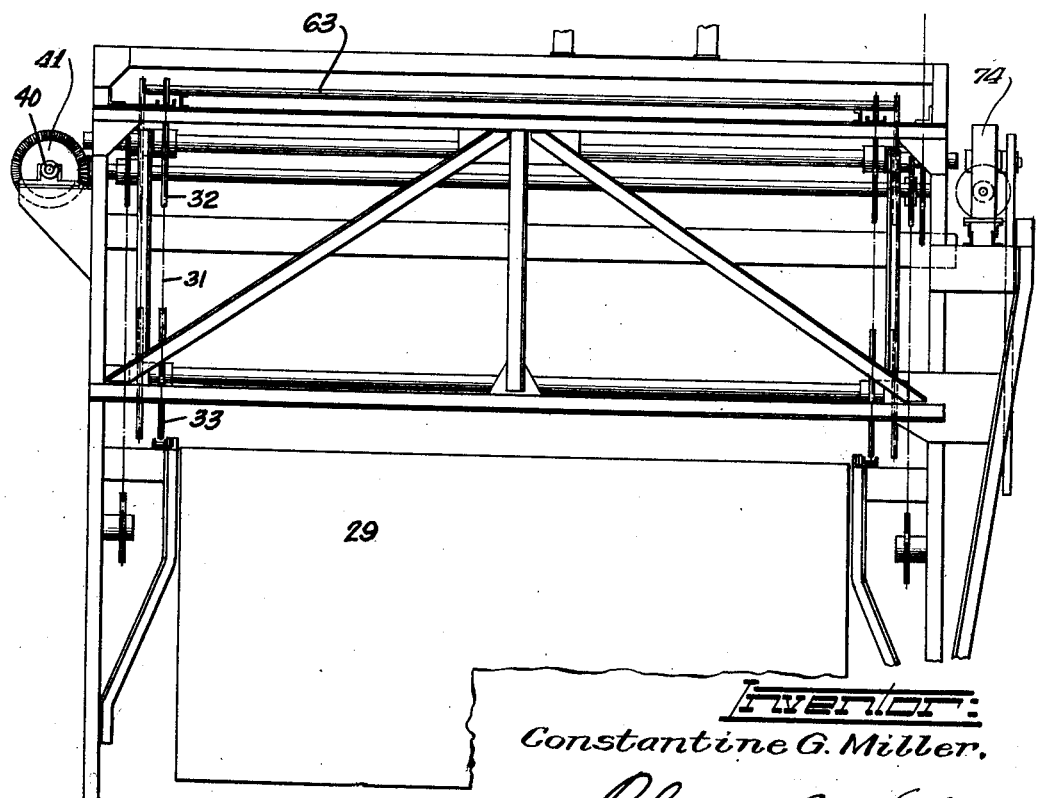

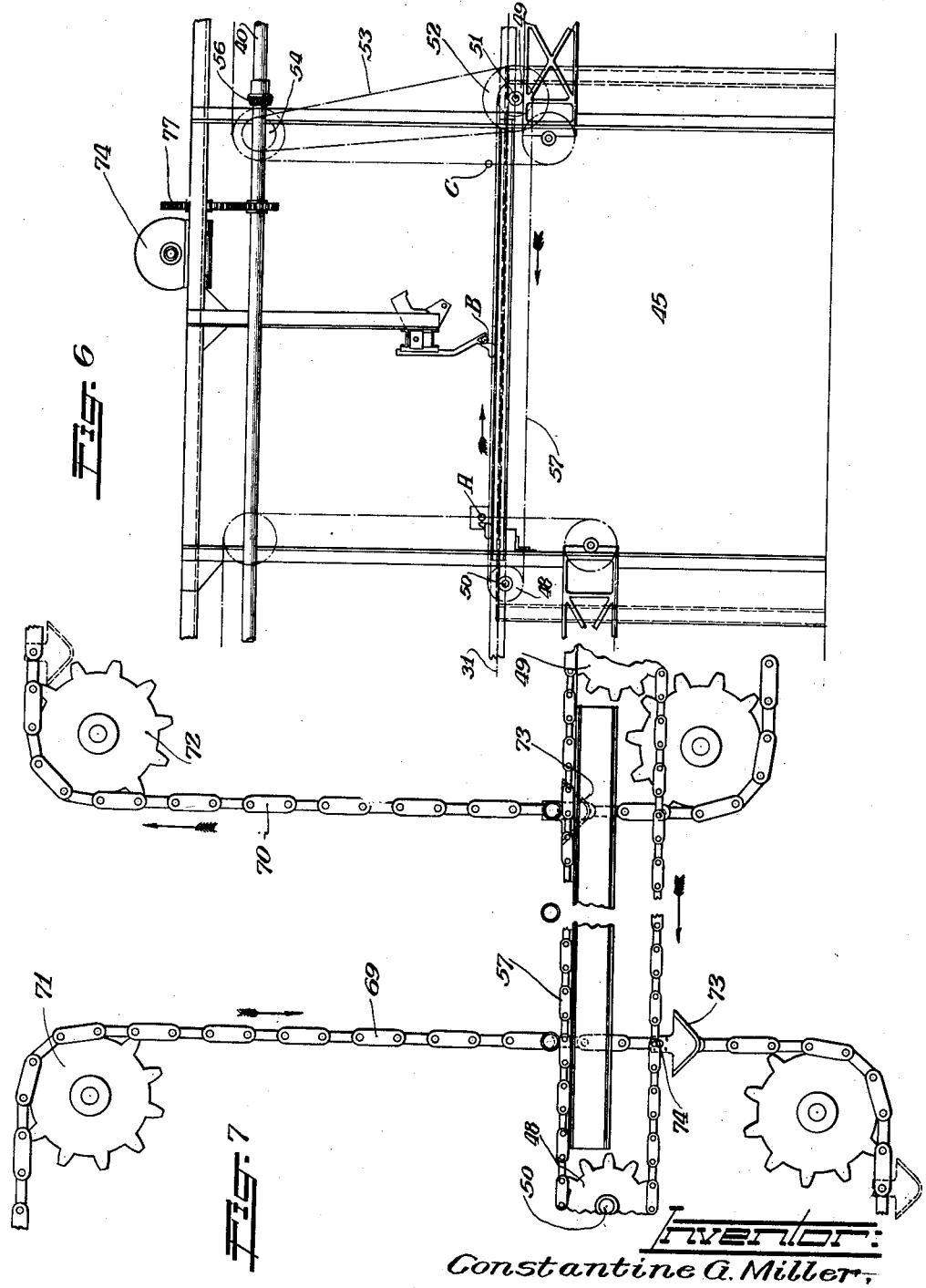

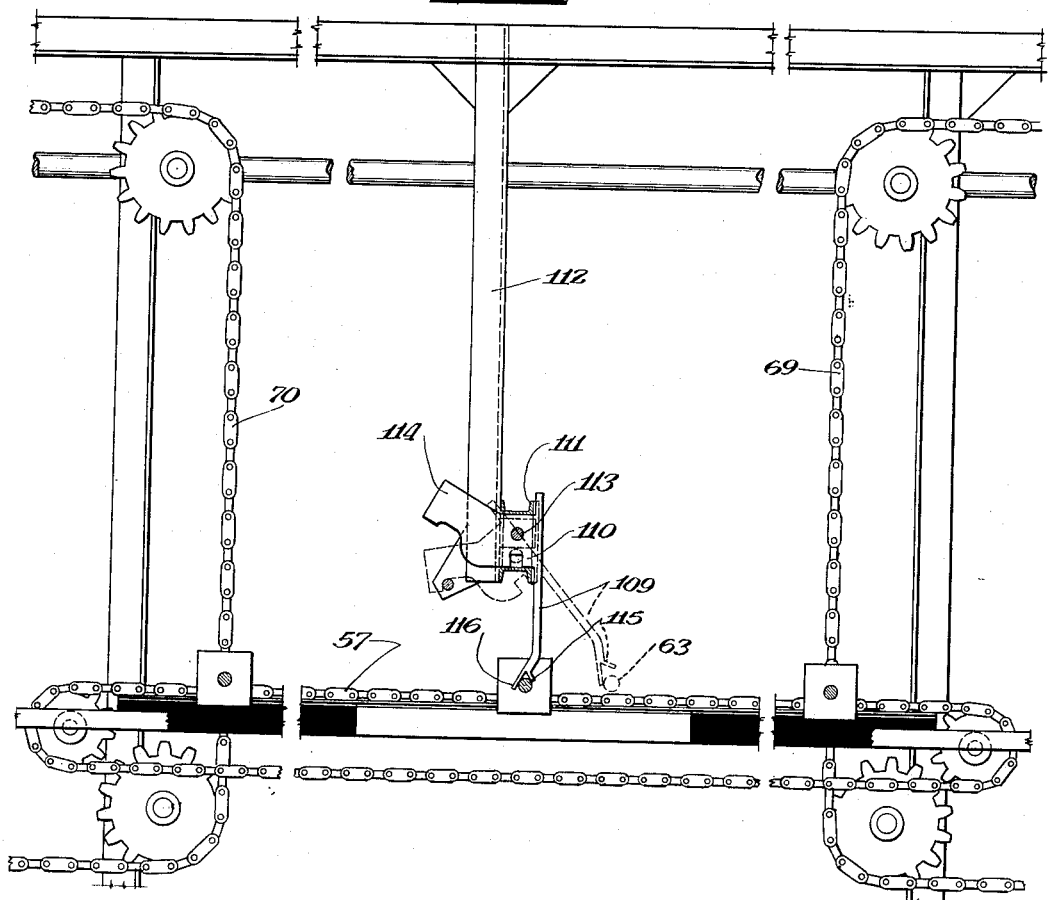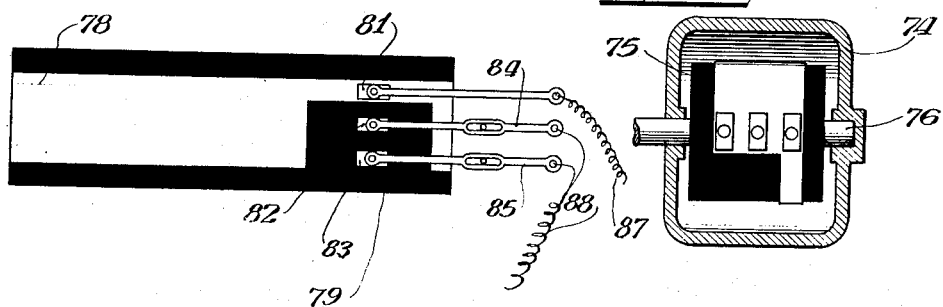

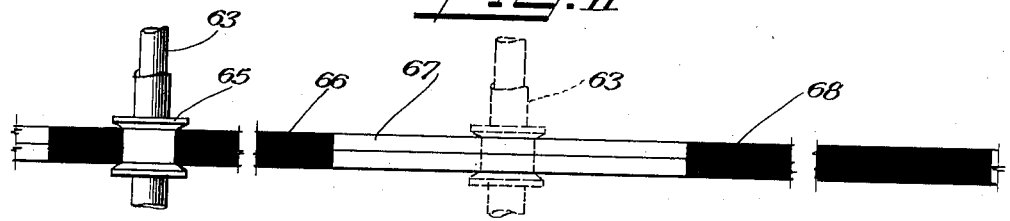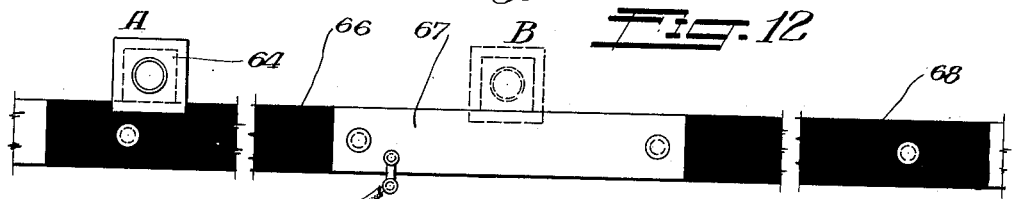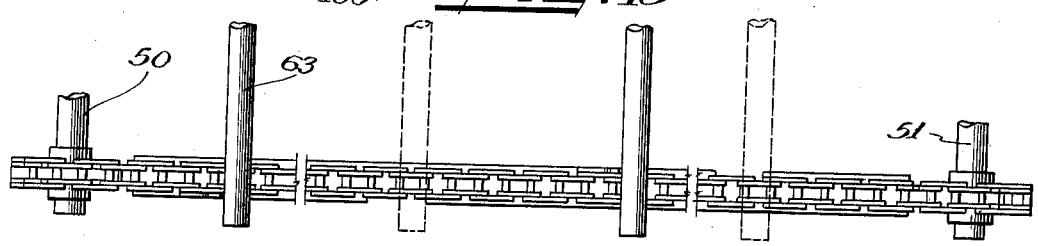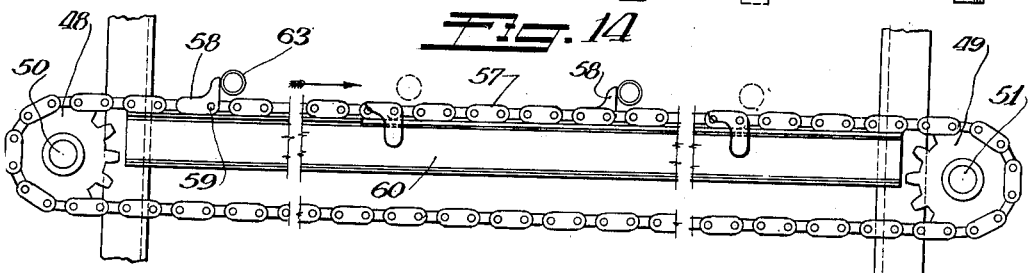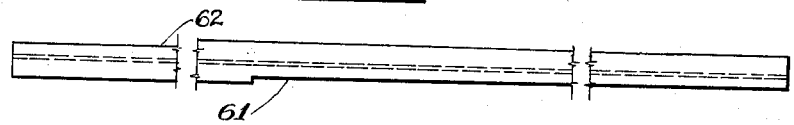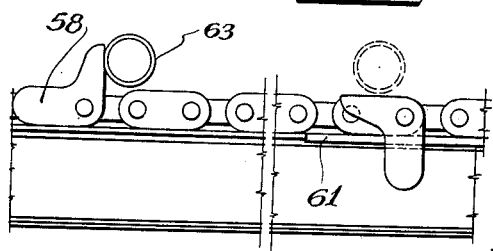

June 9, 1931.  C. G. MILLER  1,809,138
AUTOMATIC CHROMIUM PLATING MACHINE
Filed June 30, 1928   7 Sheets-Sheet 7
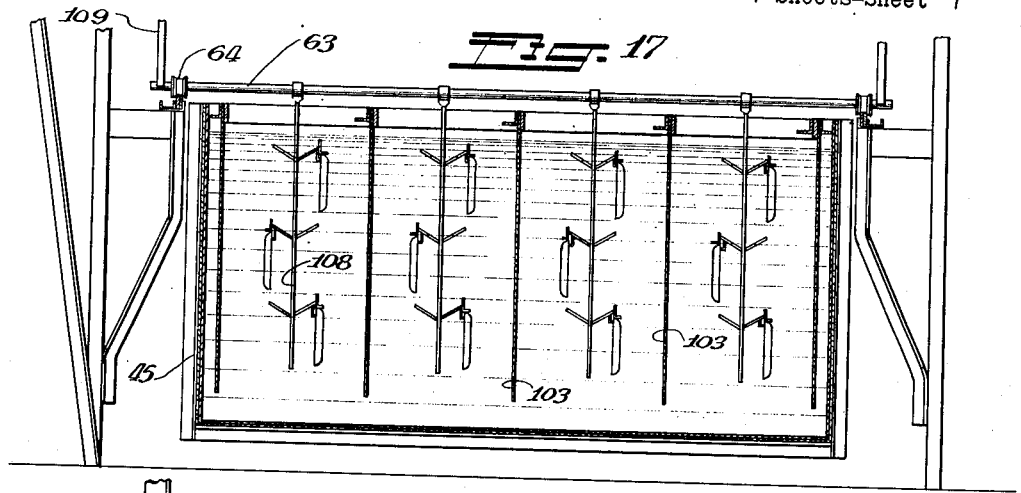
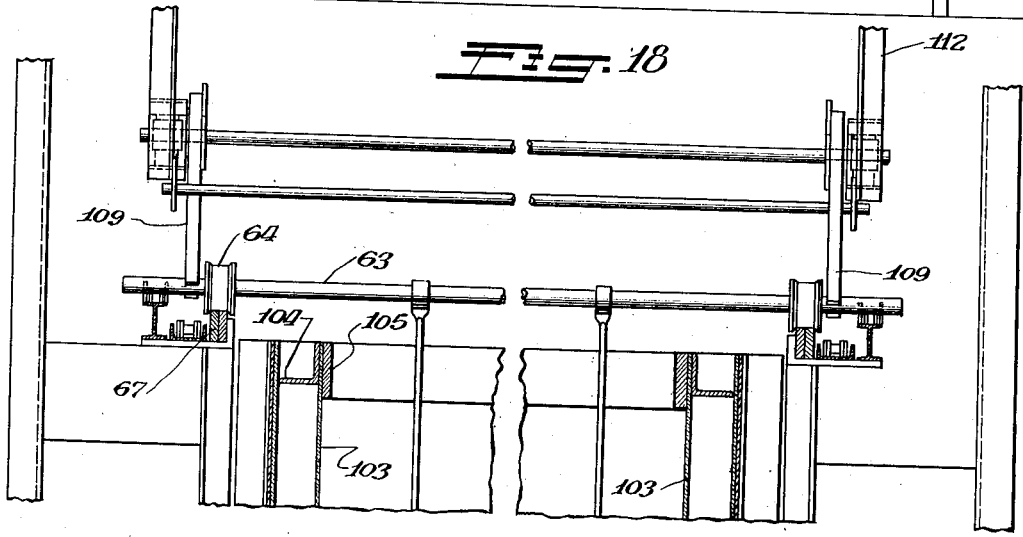
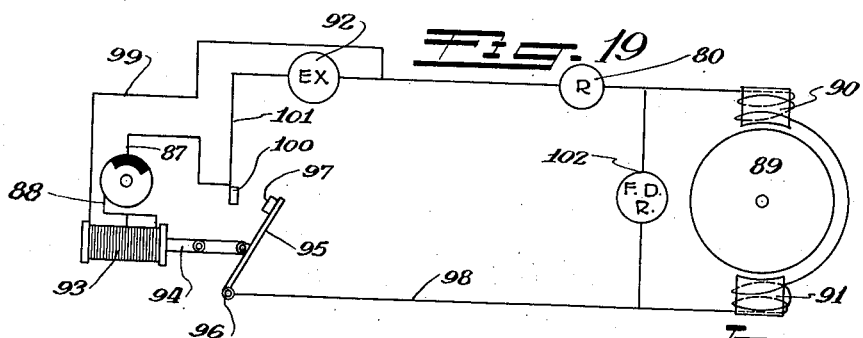
Inventor:
Constantine G. Miller.

Patented June 9, 1931

1,809,138

UNITED STATES PATENT OFFICE

CONSTANTINE G. MILLER, OF CHICAGO, ILLINOIS, ASSIGNOR TO THE MEAKER CO., A CORPORATION OF ILLINOIS

AUTOMATIC CHROMIUM PLATING MACHINE

Application filed June 30, 1928. Serial No. 289,588.

This invention relates to electro-plating machines and particularly to a machine for automatically plating articles with chromium.

It is necessary in chromium plating to have a steady uninterrupted non-fluctuating flow of electric current of predetermined voltage and amperage in order to secure a bright, lustrous, hard and uniform coating of all of the surfaces to be plated, large as well as small, light as well as heavy.

Articles to be plated having relatively large surfaces to be plated have, at the present time, to be plated by hand, that is, the articles are placed in and removed from the chromium plating by hand. It has been believed impossible to use a machine for chromium plating where the work rod, that is, the rod supporting the articles to be plated, is moved in sliding contact with bus-bars and obtain a uniform voltage and uniform current.

There are machines now on the market involving the sliding of the work rods for chromium plating, but these have not proved satisfactory. These machines employ shoes or brushes in sliding contact with bus-bars to gather the negative current. Corrosion takes place readily, with the result that these contacts become dirty, and the shoes or brush, when dirty or corroded, become contact resistors to some extent, thus preventing the flow of the full current necessary for successful chromium plating.

Slight variation in the flow of the current in chromium plating often causes spots or streaks in the articles being plated, thereby rendering these articles unacceptable.

The present machines employing the sliding contacts are not successful in plating large pieces of metal or where heavy current densities are used.

I have found that articles may be successfully automatically plated with chromium in a machine where the work rod, which is the cathode, is brought to rest on the plating tank, and while at rest, an electric current of predetermined density is supplied to the work rod. I have found that by stopping the work rod before the current is supplied thereto and cutting off the current before the rod is moved, very successful results are obtained. The current preferably employed is one with a voltage between 6 and 12 and with the amperage running from 150 amperes per square foot upwards.

The work rod arranged in accordance with my invention is automatically delivered to the plating tank, automatically moved to a position of rest on the tank where it remains for a predetermined period of time. During this period of time, the current of predetermined density is supplied to the work rod and automatically cut off, whereupon the rod is moved automatically to a position to be engaged by a transfer mechanism for removing the rod and its supported articles from the bath. No current is supplied to the rods while being delivered to or removed from the tank or while being moved to or from the rest position.

An object of the invention is to provide an efficient and reliable automatic machine for chromium plating.

Another object is to provide an automatic machine for chromium plating in which a work rod supporting the articles to be plated is automatically moved along a plating tank, stopped, and while stopped is put in circuit with an electric current, the current then broken, and the rod moved away.

A further object is to provide an automatic machine for chromium plating in which a work rod is automatically moved along the plating bath and stopped in said bath for a predetermined period of time, and while stopped, is connected in circuit with an electric current of definite density for a period of time which is not longer than the rest period of the rod.

A further object is to provide a chromium plating machine in which physical contact between the work rod and bus-bars is automatically established during the period that current is supplied to said rod.

A further object of the invention is to provide an automatic chromium plating machine which will overcome the objections present in the machines now in use, for successful commercial plating.

Further and other objects will be apparent from the following description, drawings and appended claims.

According to the invention a work rod supporting the articles to be plated is automatically delivered to a plating tank, advanced a short distance on the tank, stopped, and while at rest, is supplied for a predetermined period with an electric current of predetermined density. The circuit is then broken and the rod is advanced and withdrawn from the tank.

The accompanying drawings illustrate one form of the invention and the views thereof are as follows:

Figure 1 is a side elevational view of the receiving end of an automatic chromium plating machine.

Figure 2 is a side elevational view of the delivery end of such a machine.

Figure 3 is an enlarged end elevation looking at the right hand end of the machine of Figure 2.

Figure 4 is an enlarged end view of the machine looking at the left end of Figure 1.

Figure 5 is a vertical view partially in section and with certain parts omitted, taken substantially on line V—V of Figure 2.

Figure 6 is a diagrammatic side elevational view of the plating section of the machine.

Figure 7 is a fragmental enlarged side elevational view of the conveyors used in the plating section.

Figure 8 is an enlarged fragmental view looking from the inside of the machine outwardly and showing certain details of construction.

Figure 9 is a vertical view taken axially through one form of current controller.

Figure 10 is a development of the controller of Figure 9.

Figure 11 is a fragmental top plan view of one of the trackways of the plating section.

Figure 12 is a side view of the trackways of Figure 11.

Figure 13 is a fragmental top plan view of the conveyor chain for moving the work rods thru the plating tank.

Figure 14 is a fragmental side elevational view of the conveyor for moving the work rods through the plating tank.

Figure 15 is a top plan view of a supporting member for the top run of the conveyor chain of Figure 14.

Figure 16 is an enlarged fragmental side elevational view of the lugs on the conveyor chain, showing the manner of engagement with and disengagement from the work rods.

Figure 17 is a transverse vertical section through the plating tank showing the anodes and articles supported from the work rod which forms the cathode.

Figure 18 is a fragmental enlarged vertical sectional view taken transversely through the plating tank, showing the manner of supporting the anodes in the tank.

Figure 19 is a wiring diagram showing the control of the field current of the plating generator by the current controller.

Figure 20 is a vertical transverse section through the current controller.

An automatic plating machine is one in which the articles to be plated are moved automatically from the receiving end to the discharge end by conveyors which move the work rods supporting these articles longitudinally and vertically for transferring the work rods from one tank to the next. Such a machine may be as long as one hundred or more feet, and depends for its length on the number of tanks employed in carrying out a particular plating process.

The framework of the machine comprises vertical members 25, horizontal top members 26 and bottom members 27 connected at intervals by suitable cross members 28.

Tanks 29, 30 and the like are supported on the floor in the frame structure and are used for cleaning, rinsing or other operations preliminary to the plating operation.

The machine illustrated has a main endless conveyor 31 passing over wheels 32, 33, 34 and 35, with the lower run 36a of the chain arranged along the tops of the tanks. It is this run of the chain that moves the several work rods through the machine along trackways adjacent the tanks by engagement with said rods of lugs or dogs arranged at suitable intervals on the chain.

Transfer conveyors 36, 37 and the like are arranged for moving the work rods vertically, raising the same from one tank and lowering it into the next tank. These conveyors consist of endless chains passing over rollers 38 and 39, the rollers 39 being driven through suitable gearing from a shaft 40 which extends lengthwise of the machine and is connected to all of the wheels 39 of the several transfer conveyors for operating these at constant uniform speed. The transfer chains 36 and 37 are provided with suitable fingers or lugs for engaging a work rod on the trackway of one tank and delivering it onto the trackway of the next tank.

The shaft 40 is driven through gears 41 and 42 from a motor 43 arranged on the frame structure of the machine. The motor operates a Reeves drive 44 whereby the speed of the shaft may be varied, as desired.

The plating tank 45 is supported in the machine as are the other tanks, and rinsing tanks 46 and 47 are served by transfer conveyors so that the articles plated in the plating tank 45 may be properly washed before removal from the machine.

Referring to Figures 6 and 7 of the drawings, it will be observed that over the plating tank 45, a supplemental conveyor is provided for moving the articles through the plating tank in a different manner than these are moved by the main conveyor 31.

The plating tank or supplemental conveyor comprises sprocket wheels 48 and 49 arranged on shafts 50 and 51 in the frame. The shaft 51 is driven by a sprocket wheel 52 actuated by a sprocket chain 53 passing over sprocket wheel 54 on shaft 55 supported in the frame structure, which shaft is driven by a bevel gear 56 from the shaft 40.

This arrangement, therefore, drives the supplemental conveyor chain 57 which passes over the sprockets 48 and 49 continuously and at constant speed, the direction of movement being indicated by the arrows in Figures 6, 7 and 14.

Attached to the chain 57 at intervals in the length thereof are fingers or dogs 58 pivoted at 59 to the chain, and are angular in side elevation. The dogs are arranged to turn about the pivot with the active face thereof in line with the top of the chain 57 unless held in active position.

An I-beam 60 is arranged immediately underneath the top run of the chain 57 and has a notch 61 cut in one side of the top flange thereof at a certain position in the length of the same and another notch 62 cut in the opposite side of the top flange at a predetermined position. The notches extend in opposite directions. The dogs 58 are arranged alternately on opposite sides of the chains 57.

The chain 57, moving continuously in the direction indicated by the arrows, will cause the dogs 58 to ride on the top flange of the I beam 60 in the position shown in full lines in Figures 14 and 16 until the outer dog reaches the notch 61, whereupon the same swings counterclockwise about its pivot into the dotted line position of Figure 14 and the full line position at the right in Figure 16. This is the release position of the dogs. The dog remains in the inactive position until the depending leg strikes the top flange of the beam 60 at the left end thereof as viewed in Figures 14 and 15, whereupon it is moved into active position to engage the work rod delivered to the plating tank trackway by the transfer conveyor 69.

The dog 58 on the inner side of the chain is actuated in the same manner but in different timed relation with regard to the dog on the outer side of the chain. It remains in inactive position until the depending leg strikes the notch 62 when the dog 58 on the inner side of the chain is raised to active position to engage the work rod in the plating position and move it to the end of the tank for removal by the transfer conveyor 70.

The work rods 63 are long enough to extend beyond the sides of the plating tank 45 and are provided near the ends thereof with slides 64 having marginal flanges 65 to retain the slides in engagement with the trackways along the several tanks of the machine, and particularly with the trackways along the plating tank 45.

The trackways for the plating tank 45 comprise an insulated section 66, an intermediate bus bar section 67 and another insulated section 68, the bus bar section 67 being placed in the middle of the length of the trackway and comprising but a short portion of the length of the trackway.

The work rods 63 support the articles to be plated and form the cathodes of the electric circuit.

Figure 7 shows the plating tank conveyor 57, a delivery transfer conveyor 69 and a withdrawing transfer conveyor 70. Each of these transfer conveyors comprises an endless chain passing over sprockets 71 and 72 respectively, which sprockets are driven by suitable gearing from the shaft 40 and move at constant uniform speed.

These transfer conveyors as well as the other transfer conveyors of the machine are provided at intervals in the length thereof with cups 73 pivoted at 74 to the chains, so as to always be in the position shown in full lines in Figure 7. The ends of the work rods are received in these cups 73 from the tank immediately preceding the plating tank and transferred by the conveyor 69 into the plating tank 45 in the position A of Figure 6. In this position, the slides 64 of the work rod are resting on the insulating section 66 of the plating tank trackway. This position is referred to as the first position.

The position of the lugs 58 on the conveyor chain 57 is such that as soon as a work rod is delivered to the plating tank trackway in the position A, it is engaged by a dog 58 on the chain 57 as shown at the left in Figure 14, and moved to the second or B position when the lug enters the cut-out section 61 on the I beam 60 and drops, releasing its engagement with the work rod 63. Thereupon the work rod comes to rest in the second or B position, in which position the slides 64 are on the bus-bar section 67 of the plating tank trackway, as shown in Figures 6, 11 and 12.

The inner lug 58 on the chain 57 is so disposed on said chain as to allow the work rod 63 to remain in the second or B position a predetermined length of time before it engages the rod and moves it onto the insulated section 68 of the trackway.

I have found that the secret of successful chromium plating resides in the bringing of the work rod to rest, and after it comes to rest, supplying an electric current of predetermined density to the work rod while at rest for a predetermined period of time, and then cutting off the current before the rod is moved from rest position. This permits the flow of current uniformly to the cathode, with the result that the articles suspended from the work rod in the plating bath are evenly and uniformly coated with the chromium to provide a bright lustrous and hard coating without any imperfections or flaws in the coating.

The work rod 63 remains in the second or B position, which is the position of rest, for a predetermined length of time, whereupon it is moved by the inner dog 58 on the chain 57 from the bus bar 67 of the trackway onto the insulated section 68 of the trackway into the third or C position where the rod is then engaged by a cup 73 on the conveyor 70 and removed from the plating tank and delivered into the first washing and rinsing tank 46.

It will be observed that the current is supplied to the work rod cathode when the same is at rest in the plating tank and that the current is continued for a length of time while said rod is at rest. The use of the insulated sections 66 and 68 in the trackway prevent any current flowing to the rods in the first or A position and the C or third position, with the result that no harmful effects are caused to the articles suspended by the work rods in these two positions while entering or leaving the plating tank.

The length of the plating tank 45 is such that the steps of delivery, plating and withdrawing of the work rods in the three positions in the plating tank is such that no harmful effects are created as to the articles supported by the rods in the A and C positions because of the flow of current through the rod in the B position.

The generator used for plating the articles supported by the work rod in the B position is of low potential with high amperage. It is not feasible to break this generator current entirely, as no circuit breaker has as yet been devised which will accomplish breaking of the current without detrimental results to the generator. I therefore break the field circuit of the generator employed for furnishing the plating current.

The generator is separately excited and is preferably rated at 12 volts.

Figure 19 is a wiring diagram of the connections of the field circuit with the current controller used in this machine.

Figure 9 is a section through the controller and shows a casing 74 supported on the upper part of the framework of of the machine with a drum 75 of insulating material carried on a shaft 76, which shaft is connected through a gear train 77 with shaft 40 which drives the conveying mechanism of the machine. The gear train 77 is so designed that the drum 75 is rotated in timed relation with the movement of the conveyor chain 57 in the plating section and the transfer conveyors 69 and 70 in order that the current may be supplied to the work rod in the plating section only during the time it is at rest, as heretofore described.

The drum 75 is shown in developed form in Figure 10 and has thereon a metal conductor strip 78 with a portion thereof cut out at 79 forming a gap. A brush holder 81 for supporting a brush to contact the conductor 78 is suitably secured in the casing 74 of the controller and is a fixed brush holder.

Brush holders 82 and 83 for engagement with the conductor strip 78 are supported by the casing 74 in a manner to permit longitudinal adjustment thereof with respect to the fixed brush holder 81 whereby the length of the interruption of the circuit controlled thereby may be varied.

The brush holders 82 and 83 are supported on the ends of arms 84 and 85 which are secured by set screws 86 to the casing 74 of the machine, so as to be movable in both directions with respect to the screws 86 in order to vary the effective gap whereby the period of time that the current is supplied to and cut off from the bus bar sections 67 of the plating tank trackways may be varied.

Conductor 87 leads from the fixed brush 81 and a conductor 88 connected to the adjustable brushes 82 and 83 leads from these brushes for connection in circuit hereafter explained.

Figure 19 shows in diagrammatic form the generator at 89 with fields 90 and 91. An exciter 92, preferably of 125 volts, is in circuit with the fields 90 and 91 of the generator. The leads from the armature of the generator are connected as hereafter described to the anodes and cathodes of the plating tank.

A solenoid 93 having a core 94 is carried by the current controller and an arm 95 pivoted at 96 is provided with a contact 97.

A lead 98 is connected between the pivot 96 of the arm 95 and the field 91 of the generator. A conductor 99 from the exciter circuit is connected to one end of the relay and the other ends of the relay are connected to the conductor 88 from the adjustable brushes 82 and 83 of the controller. The fixed brush 81 is connected by a conductor 87 to a contact 100 from which contact a lead 101 is connected to the exciter circuit.

A rheostat 80 is inserted between the exciter and field 90 of the generator to regulate the exciter current to the generator.

A field discharge resistor 102 is connected across the leads to the fields 90 and 91 of the generator, so that a repulsion or flash results when the field circuit is opened.

The arm 95 of the relay is normally in closed position. The solenoid 93 is energized when the brushes 82 and 83 are in contact with the conductor strip 78 on the drum 75 of the controller. Energization of the relay moves the arm so that the contact 97 thereon engages the contact 100, thereupon establishing the circuit through the field of the generator, with the result that an output current passes from the armature of the generator to the anode and cathode of the plating tank and will continue to flow as long as the brushes 82 and 83 are in engagement with the conductor 78, and will be broken the moment one of these brushes leaves this conductor and bears against the insulated gap 79 of the conductor.

The anodes 103 are lead plates supported in the plating tank 45 in the following manner. At intervals in the width of the tank, angle bars 104 are secured. The anodes 103 are clamped between the angle bars 104 and a conductor strip 105 fastened by bolts (not shown) passing through the angle bars, anode strips and conductor 105. This arrangement places all of the anodes in series and the conductor 105 is connected to one of the leads to the generator armature.

The bus bar section 67 of the plating tank trackway is connected by a conductor 106 to the generator armature.

It will be observed that when a work rod is moved into the second or B position of the plating tank, the controller then establishes a current through the conductor 106, bus bar 67, work rod slide 64, the work rod 63, the articles suspended from this rod, the bath, to the anodes 103 and back to the generator. This current continues until the gap in the controller reaches the adjustable brushes 82 and 83 when it is broken. The making and breaking of this current is done while the work rod is at rest, and continues for a period of time not longer than the rest period of the work rod on the bus bar section 67 of the plating tank trackway.

A machine made in accordance with this invention automatically delivers a work rod to the plating tank where it is received on an insulated trackway and thus is free from the passage of any current through the bar. It is then automatically moved into engagement with the bus bar sections 67 of the trackways and there stopped, and while stopped, is automatically supplied with a current of predetermined density for a predetermined time. When the current is cut off, the bar is removed from the bus bar section of the trackway to the third or C position, whence it is lifted from the tank by the conveyor 70, all operating in timed relation and automatically.

Suitable instrumentalities may be employed to control the amperage of the current output of the generator to meet the requirements of proper chromium plating. Articles having large surfaces to be plated require extremely heavy currents.

The articles to be plated are arranged on the depending arms 108 carried by the work rod 63 in positive engagement so as to assure proper electrical contact with the cathode, that is, the work rod 63. When plating an article like an automobile radiator shell, a spread spring clamp is secured to the inner side of the shell throughout the length thereof to assure passage of the current throughout the length of the shell. Articles of other shapes are properly connected to the hangers 108 to assure positive electrical connection for successful and complete plating.

When the current is supplied to the work rod for chromium plating, it must be continued without interruption, otherwise imperfect plating results. After plating, the objects may remain in the bath for an interval of time without being damaged, but once the current is cut off, it may not be turned on for another coat of chromium unless the articles have been taken out and thoroughly washed.

It will be observed that my machine accomplishes automatic chromium plating in a manner above described. It is possible to plate the articles suspended from one work rod while another work rod is being lowered into the tank and a third one being removed, the only supply of current being to the rod in rest position, as the other rods are supported on insulated sections of the plating tank trackway.

The insulated sections 66 and 68 may be made of bakelite, fiber or any other suitable insulating material.

Figures 2, 6 and 8 show means for increasing the physical contact of the work rod slides 64 whenever conditions warrant.

The hold-down device shown is but one form of such device and comprises preferably two of these, one arranged near each side of the machine adjacent the plating section and comprising an arm 109 carried in a crosshead 110 arranged to slide in guides 111 supported by frame members 112 fastened to the frame structure of the machine.

The arm 109 is pivoted at 113 in the crosshead and has a weighted end 114 on the other side of the pin 113 and in angular position with respect to the arm.

The hold-down device is so arranged that in normal position, it will lie as shown in dotted lines in Figure 8.

The end of the arm 109 is forked, having unequal projections 115 and 116 in the forked end.

In normal position, that is, the dotted line position of Figure 8, the forked end 116 will, by reason of the weight 114, lie in the path of movement of the advancing work rod 63 and will be contacted by said rod and moved by the same.

The cross-head 110 will rise in the guides 111 into the full line position of Figure 8, which is the position occupied by the work rod when at rest and while the electric current is being supplied to the rod. This arm and its attached weight will bear down on the rod and increase the surface contact between the slide 64 and the bus bar 67.

Figure 5 shows the arms 109 as bearing against the work rods 63 outwardly of the slides 64.

As the rod is moved from the second or B position towards the third or C position, the rod will ride with it in clockwise direction, as seen in Figure 8, until it rides over the rod, whereupon it will return to the normal or dotted line position of Figure 8.

The use of such a hold-down device is not essential, but is shown as one means for increasing surface contact between the work rod slides and the bus bars whenever conditions warrant. It might so happen that very heavy and very large articles are to be plated requiring a very dense current, and as an additional means of utilizing all of said current, such hold-down device or similar ones might readily be utilized.

The timing of the transfer conveyors 69 and 70 and the plating tank conveyor 57 is such that as soon as a work rod is lowered into the first or A position in the plating tank, it is moved into the second or B position which is the plating position.

Assume that the time of the plating cycle is 60 seconds. The rod in the second or B position would remain there for 48 or 49 seconds during which time the current has been cut in, built up to maximum, which requires say 2 seconds, continued, and then cut off. The chain 57 with its dogs 58 immediately moves the rod from the B position to the C position where it is immediately picked up by the transfer conveyor 70 and withdrawn, and moves another rod just received in the A position to the B position. By the time the current is built up after being cut in by the automatic controller, the articles on the work rod being withdrawn by the transfer conveyor 70 are practically out of the tank.

The several conveyors of the plating section are so timed as to carry out the successive movements of the work rods with respect to the plating tank that no time elapses except that predetermined interval during which the rod is at rest in the plating or B position.

The term "work rod" as used in the appended claims is generic and includes the pieces or articles to be plated, and the means for securing same to the rod and should be so construed in the claims.

While I have described more or less precisely the details of construction of my invention, yet I do not wish to be limited thereto, as I am aware that changes may be made in the arrangement and proportion of parts and that equivalents may be substituted, all without departing from the spirit and scope of my invention.

I claim as my invention:

1. An automatic chromium plating machine comprising means for delivering articles to be plated to a plating tank, an endless chain having pivoted fingers for advancing said articles to a position of rest in said tank, means for supplying electric current to said articles while at rest, and means for withdrawing said articles from the tank, all of said parts being actuated automatically and in timed relation.

2. An automatic chromium plating machine comprising means for delivering a work rod to a plating tank, a chain for pushing said rod in step by step movement along said tank, a trackway for supporting said rod along said tank, said trackway comprising a bus-bar intermediate the ends of the same, said pushing means being arranged to move said rod onto said bus bar the rod being released from the chain while in such position, means for supplying current to said bus-bar while said rod is in rest position, means for controlling the duration of said supply of current while said rod is at rest, said pusher chains then moving said rod away from said bus-bar, automatic means for actuating said pusher, and automatic means for controlling said current supply, said automatic means being operated in timed relation.

3. An automatic chromium plating machine comprising an endless chain having pivoted fingers for receiving a work rod and moving it along a plating tank to a position of rest, said chain being effective after a predetermined interval for moving said rod from rest position, means effective for supplying electric current to said rod while in rest position, said current supply means being arranged to deliver current to said rod after the same comes to rest and to cut off the current before said rod is moved from the rest position, and means for operating all of the aforesaid parts automatically and in timed relation.

4. An automatic chromium plating machine comprising an endless chain having pivoted fingers for receiving a work rod and moving it along a plating tank to a position of rest, said chain being effective after a predetermined interval for moving said rod from rest position, means effective for supplying electric current to said rod while in rest position, said current supply means being arranged to deliver current to said rod after the same comes to rest and to cut off the current before said rod is moved from the rest position, means for operating all of the aforesaid parts automatically and in timed relation, said chain arranged in such a manner that the rest period of the rod may be varied, and said current supply means being arranged to vary the period of time said current is supplied to said rod.

5. An automatic chromium plating machine comprising a conveyor for delivering a work rod to a plating tank, a conveyor for removing said rod from said tank, an endless chain having pivoted fingers for moving said rod to a position of rest in said tank intermediate said first and second conveyors, means for putting said work rod in circuit with a generator current when in rest position, means for controlling the duration of said current, means for moving said rod from said rest position to said removing conveyor after said current is cut off, and all of said parts being operated automatically and in timed relation.

6. An automatic chromium plating machine comprising means for delivering a work rod to a plating tank, means for moving said rod through said plating tank in step by step movement, said means comprising a continuously moving conveyor chain, fingers on said chain, means for delivering a work rod to said chain in time to be engaged by a finger, means for causing the release of said finger from engagement with said rod after the rod has been advanced a certain distance thereby stopping said rod, means for putting said rod in circuit with a generator while at rest, means for cutting out said circuit after a predetermined interval, said chain arranged to then pick up said rod after current cut off and advance the same further along the tank, means for moving the said rod from said tank, and means for making and breaking said circuit.

7. An automatic chromium plating machine comprising a plating tank, a trackway along said tank, said trackway having a bus-bar section and insulated sections outside of said bus-bar, a work rod having a conductor shoe sliding on said guideway, means for delivering the work rod to one of said insulated sections, an endless chain having pivoted fingers for moving said rod onto said bus-bar section, said rod coming to rest thereon, means for supplying electric current to said bus-bar section while said rod and shoe are at rest thereon, means for cutting off said current, and means for moving said rod from said bus-bar section to another insulated section of the trackway, all of said parts being operated automatically and in timed relation.

8. An automatic chromium plating machine comprising a plating tank, a trackway along said tank, said trackway comprising separated insulating sections and a bus-bar section intermediate said insulating sections, a work rod having a shoe for engaging said trackway, said rod and said shoe being conductors, an endless chain having pivoted fingers for moving said rod from one insulating section onto the bus-bar section, a current controller for supplying electric current to said bus-bar after said rod has stopped thereon and cutting off said current before the rod is removed from said bus-bar, means for moving said rod from said bus-bar section onto another insulated section of said trackway, said current controller and said rod and chain operating automatically and in timed relation.

9. An automatic electric chromium plating machine comprising a plating tank, trackways along said tank, a chain for moving work rods along said trackway, said chain having angle fingers pivoted thereto, a rest over which said chain rides to maintain said fingers in operative position against a rod, said rest having a recess causing the fingers to fall away from engagement with the rod when said recess is reached by said fingers.

10. An automatic chromium plating machine comprising a plating tank, a trackway along said tank, a bus-bar in said trackway intermediate the ends thereof, an endless chain having pivoted fingers for receiving a work rod and moving the same onto said bus-bar said fingers being released from the rod when the rod is on said bus-bar, a hold-down for said rod comprising an arm arranged on a sliding pivot in unbalanced position and having a forked end in the path of travel of the work rod to engage the same as said rod is moved along the trackway, said arm having a weight for opposing movement of the same by the work rod and for pressing the same downwardly against the work rod when the latter is at rest on the bus-bar.

11. An automatic chromium plating machine comprising a plating tank, trackways along said tank, a bus-bar in said trackway intermediate the ends of the same and insulated from the end portions of the trackway, a conveyor chain having pivoted fingers for receiving a work rod and moving it along the trackway to the bus-bar section thereof, means for causing the release of said rod from said conveyor fingers when the same reaches said bus-bar, means for subsequently removing said rod from said bus-bar and withdrawing the rod from the tank, and means for supplying electric current to said bus-bar section while the rod is at rest thereon, said current supplying chain and said conveyor means being operated automatically and in timed relation.

12. An automatic chromium plating machine comprising means for delivering articles to be plated to a plating tank, a trackway along said tank for supporting said articles therein, said trackway consisting of end sections of insulating material and intermediate bus-bar section, an endless chain having pivoted fingers for advancing said articles onto said bus-bar, means for supplying electric current to said bus-bar while said articles are in contact with the same, means for moving said articles onto the end insulated section of the trackway, and means for withdrawing said articles from said insulated section.

13. An automatic chromium plating machine comprising a plating tank, means for delivering a work rod to said tank, means for removing said rod from said tank, a conveyor for moving said rod through said tank, said conveyor comprising an endless chain moving continuously, pivoted fingers arranged on alternate sides of said chain, means for maintaining said fingers against the work rod for definite distances of movement of said rod and for causing the release of said fingers from said rod at predetermined positions of movement of the rod, a trackway, said trackway having a bus-bar section adjacent the position where the rod is released by said fingers, means for supplying an electric current to said work rod while on said bus-bar, means for cutting off said current, and said alternate fingers on said chain then caused to engage said rod and remove the rod from the bus-bar.

14. An automatic chromium plating machine comprising a plating tank, a trackway along said tank, said trackway having insulated end sections and an intermediate bus-bar section, means for delivering a work rod to the first insulated section, a conveyor chain for moving said rod onto said bus-bar, means for disengaging the conveyor chain from engagement with the rod when the rod reaches the bus-bar, and other means for causing engagement between said chain and said rod after the rod has remained on said bus-bar for a predetermined period of time, and means for supplying an electric current to said bus-bar while said rod is resting on the same.

15. An automatic chromium plating machine comprising a plating tank, trackways along said tank, the middle portions of the trackways comprising bus-bars and the end portions of the trackways being of insulated material, means for delivering a work rod onto the first insulated section of the trackway, an endless chain for moving said rod along said trackway, onto said bus-bar, a finger pivoted to said chain, a rest for engaging said finger to hold the same against said rod while moving the rod onto the bus-bar, and means for causing the finger to swing away from said rod when the rod reaches the bus-bar, and means for supplying electric current to the bus-bar while the rod is at rest thereon, said current supply means operating in timed relation with said chain.

16. An automatic chromium plating machine comprising a plating tank, trackways along said tank, the middle portions of the trackways comprising bus-bars and the end portions of the trackways being of insulated material, means for delivering a work rod onto the first insulated section of the trackway, an endless chain for moving said rod along said trackway onto said bus-bar a finger pivoted to said chain, a rest for engaging said finger to hold the same against said rod while moving the rod onto the bus-bar, means for causing the finger to swing away from said rod when the rod reaches the bus-bar, means for supplying electric current to the bus-bar while the rod is at rest thereon, said current supply means operating in timed relation with said chain, and a second finger on said chain arranged to engage said rod after the same has been at rest on the bus-bar for a predetermined period of time to move said rod onto another insulated section of the trackway.

17. An automatic chromium plating machine comprising a plating tank, trackways along said tank, the middle portions of the trackways comprising bus-bars and the end portions of the trackways being of insulated material, means for delivering a work rod onto the first insulated section of the trackway, an endless chain for moving said rod along said trackway onto said bus-bar and stopping the rod on said bus-bar, a finger pivoted to said chain, a rest for engaging said finger to hold the same against said rod while moving the rod onto said bus-bar, and means for causing the finger to swing away from said rod when the rod reaches the bus-bar, means for supplying electric current to the bus-bar while the rod is at rest thereon, said current supply means operating in timed relation with said chain, said rest for said conveyor chain comprising a flat surface underlying the active run of the chain on which surface said finger slides in position to engage the rod, said surface having a recess adjacent the bus-bar section of the trackway to cause said finger to fall away from said rod from movement by the chain from that position.

18. An automatic plating machine comprising a plating tank, a trackway along the tank, said trackway comprising a bus-bar as the middle portion thereof and with the end portions of insulated material, means for delivering a work rod to the insulated section of the trackway at the front of the tank, a conveyor chain having a finger thereon arranged to engage said rod as the same is delivered to said insulated section and to move said rod onto the bus-bar, means for disengaging said finger from said rod when the rod reaches the bus-bar, another finger on said chain arranged to engage the rod on the bus-bar after the rod has remained at rest thereon for a predetermined interval and moving said rod onto the insulated section of the trackway at the rear of the tank, and means engaging said rod as the same is moved onto said last mentioned insulating section to withdraw the rod from the tank.

19. In a plating machine including a plating tank, work rods, means for moving said work rods thru the tank comprising an endless chain provided with alternately arranged pivoted fingers for contacting and moving the rods, and other means cooperating with said first named means for making and breaking contact between the fingers and rods at different periods of travel of the rods through the tank.

In testimony whereof I have hereunto subscribed my name at Chicago, Cook County, Illinois.

CONSTANTINE G. MILLER.